United States Patent
George et al.

(10) Patent No.: US 12,299,186 B1
(45) Date of Patent: May 13, 2025

(54) TAMPER DETECTION SYSTEMS FOR ELECTRONIC DEVICES

(71) Applicant: Amazon Technologies, Inc., Seattle, WA (US)

(72) Inventors: Sajin George, Newton, MA (US); Vivek Anand, Chelmsford, MA (US); Krutarth Mukesh Gathani, Redmond, WA (US); Hector Jonathan Espinoza, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 238 days.

(21) Appl. No.: 17/954,244

(22) Filed: Sep. 27, 2022

(51) Int. Cl.
*G06F 21/86* (2013.01)

(52) U.S. Cl.
CPC .................... *G06F 21/86* (2013.01)

(58) Field of Classification Search
CPC ........................................... G06F 21/86
USPC ................................................ 726/34, 24
See application file for complete search history.

(56) References Cited

U.S. PATENT DOCUMENTS

| | | | |
|---|---|---|---|
| 5,574,786 A * | 11/1996 | Dayan | G06F 21/86 726/36 |
| 9,117,106 B2 | 8/2015 | Dedeoglu et al. | |
| 9,235,928 B2 | 1/2016 | Medioni et al. | |
| 9,473,747 B2 | 10/2016 | Kobres et al. | |
| 11,480,445 B2 * | 10/2022 | Campbell | G06F 21/86 |
| 2013/0284806 A1 | 10/2013 | Margalit | |
| 2015/0186676 A1 * | 7/2015 | Arora | G06F 21/725 713/187 |
| 2021/0225159 A1 * | 7/2021 | Grobelny | G08B 29/16 |

* cited by examiner

*Primary Examiner* — Bryan F Wright
(74) *Attorney, Agent, or Firm* — Kilpatrick Townsend & Stockton LLP

(57) ABSTRACT

Systems and techniques for tamper detection of electronic devices are described. The tamper detection is performed using a tamper circuit that includes an authenticator connected to an auxiliary power source of the electronic device via a switch. The switch is configured to open and break the connection between the authenticator and the auxiliary power source when a housing of the electronic device is opened or tampered with. The authenticator may be evaluated, and a value compared against a server-based value to determine a difference in values and thereby detect tampering.

20 Claims, 5 Drawing Sheets

TAMPER DETECTION SYSTEMS FOR ELECTRONIC DEVICES

BACKGROUND

For certain electronic devices, it is particularly important to protect against physical tampering after the device has been sold or distributed to an end-user and/or is in use in public. For example, tampering is of particular concern for devices that store or process sensitive data and for devices having functions or capabilities that incentivize unwanted, unauthorized intrusions into the devices. For example, a payment terminal may process payment transactions, and may interact with payment devices such as a payment card having a magnetic strip that is swiped in a magnetic reader of the payment terminal, a payment device having a Europay/Mastercard/Visa (EMV) chip that is dipped into corresponding EMV slot of the payment terminal, and near field communication (NFC) enabled devices such as a smartphone or EMV card that is tapped to the payment terminal and transmits payment information over a secure wireless connection. The payment terminal may receive payment information from the payment device as well information about a transaction and may communicate this information to a payment system for processing of the transaction.

As of a result of its central role in the transaction processing system, the payment terminal is a prime target for third party attackers attempting to access payment information, process fraudulent transactions, and otherwise engage in fraudulent activities or theft. In many cases, the attackers attempt to physically access components of the payment terminal, such as one or more communication lines carrying data or a processor that communicates and processes payment information. Attackers may attempt to eavesdrop on signals (e.g., a passive attack) or to modify or spoof payment processing communications (e.g., an active attack) by injecting malicious signals into the payment terminal.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

DETAILED DESCRIPTION

Figure 1:
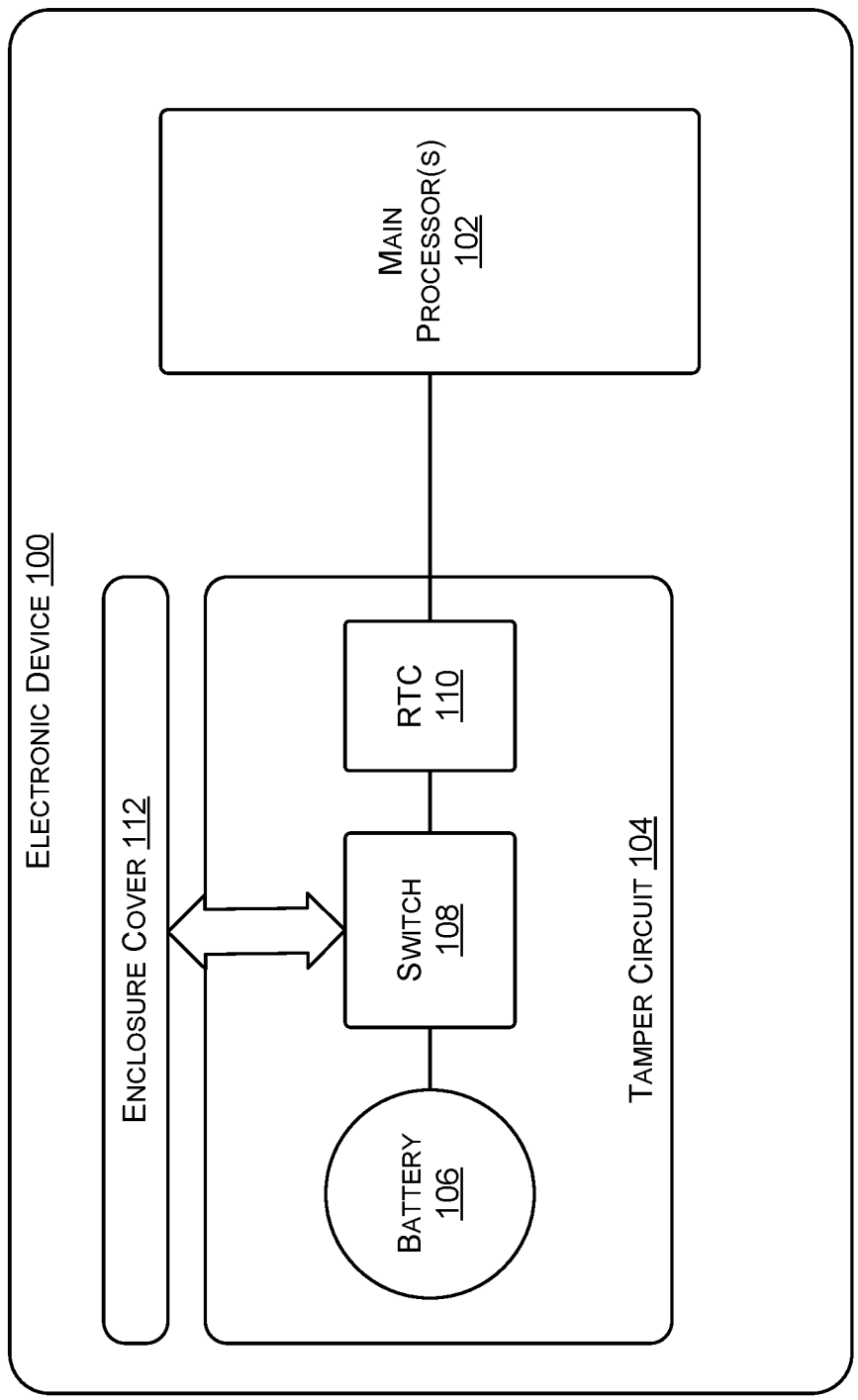
FIG. 1 illustrates an example tamper detection system using a real-time clock (RTC) within an electronic device, according to at least one example.

Described herein are, among other things, techniques, devices, and systems, for tamper detection if an unauthorized user opens or tampers with a hardware enclosure of an electronic device. In some instances, an unauthorized user may attempt to gain access to internal components or code running on a hardware platform. The systems and techniques described herein provide for detection of hardware tampering on such devices, even if the tampering occurs while the device is powered off or out of range of a network device.

In an example, the electronic device may be capable of connecting or disconnecting from power, such as having removable batteries. In such examples, an unauthorized user could take the electronic device out of range of a network device, remove the power source, modify the electronics or code of the electronic device, reassemble, and then reintroduce the electronic device back to an environment. In a specific example, the electronic device may include a payment terminal and/or a smart shopping cart for use in a sensor-connected store, such as an automated checkout store. Though some particular examples are described herein, the systems and techniques provided herein may be used for tamper detection on any number of devices.

The electronic device may include electronic devices such as servers, computers, networking components, user devices, payment terminals, smart shopping carts, and other such devices. In some examples, the electronic device may include any suitable device capable of connecting to a remote server, including any other type of electronic devices, such as a s "smart" device or Internet of Things (IoT) device, etc. The electronic device may include processor(s) and computer-readable media for carrying out instructions from one or more services or other components. As described above, in typical systems, such an IoT device may be powered off and/or removed from an environment so it cannot connect to a remote server, modified, and then reintroduced into the environment.

In a first example, the tamper detection system may use an RTC (Real-Time Clock) to detect if an un-authorized user has opened or tampered with a hardware enclosure to gain unauthorized access to code or components of a hardware platform. In particular, the RTC is a chip that is used in computers to maintain time on-board the electronic device. The system uses an RTC on-board the device to detect if someone has tampered with a hardware device, such as by detecting if an access panel has been opened or housing disassembled to gain access to the interior.

In the first example, the RTC is connected to a coin cell battery, or other auxiliary source that may power the RTC for an extended period of time. The coin cell or auxiliary power source is independent of a primary power source for the electronic device and is connected to the RTC through a switch that can disconnect power to the RTC when the switch is opened or actuated. The switch may be a normally open switch that is coupled to a cover of an enclosure for the electronic device such that if the enclosure is opened the switch breaks the electrical connection between the auxiliary power source and the RTC.

When the electrical connection is interrupted, the RTC will lose power, which causes the RTC to lose its time. When the device is reassembled and reconnected to a network (e.g., the internet), such as when it is brought back into the original environment, a main processor of the electronic device may query the RTC for its time, as kept by the RTC, and may compare the time against time from a network time protocol server (NTP server) to detect if the RTC is now out of sync, indicating tampering with the electronic device. When such tampering is detected, due to the difference in time between the RTC time and the NTP time, the electronic device may generate an alert, may shut down, erase sensitive data, and/or disable one or more functions of the electronic device. In some examples, credentials or certificates for communicating with servers or systems may be erased or disabled, thereby isolating the device from the network and preventing intrusion by the unauthorized user.

The RTC maintains precise time once synchronized by the main processor, or any processor of the electronic device. The switch controls the power to the RTC. The switch can be mechanical such as a push switch or rocker switch, magnetic, photosensitive, or any other type of switch and cuts the power off to the RTC when the enclosure cover is removed. In an example, the enclosure cover may have a magnet positioned thereon such that when the cover is removed, the magnetic switch may disconnect (such as with a reed switch). When the power to the RTC is cut off, the RTC can no longer maintain time and the processor can detect a time jump the next time it connects to a network and may then push a tamper event or raise an alarm. When the processor boots up with the electronic device, it reads the RTC time, and also checks time from the NTP server. If the time has drifted over 500 ms (or some other threshold period of time), the device may determine that the cover has been removed.

In a second example, the electronic device may be equipped with a cryptographic authenticator, such as a device containing a secure key, a cryptographic code, an RSA number, secure cryptographic chip, or other such code or device. The cryptographic authenticator may be arranged, in the second example, in a similar manner to the RTC. However, the authenticator may have a parameter, such as a code or latch that describes a state of the authenticator. The authenticator may be configured to clear the code, parameter, or latch in the event of power interruption. As such, upon having power restored and returning to the network environment, the electronic device will no longer have a stored code, key, or correct cryptographic authenticator to match a server-based authenticator. Accordingly, the electronic device may detect tampering.

The systems and techniques described herein provide for benefits over conventional tamper detections systems and techniques, particularly for IoT and other such connected devices. As the RTC or cryptographic authenticators may be continuously or periodically re-checked, the electronic device may be capable of monitoring for tampering absent any require human interaction, such as to observe a tamper evident seal being broken. Further, the tamper solutions described herein provide for detection and prevention of unauthorized attacks that other systems may not be capable of detecting, due to the powering down, loss of power to the main processing unit, and removal of the device from the network connected environment.

Though described herein with respect to detecting tampering with respect to unauthorized access into an enclosure of an electronic device, the systems and techniques described herein may also be used to detect tampering such as by removing components of a device. For instance, a shopping cart enabled for automated checkout may include multiple components such as a user interface, computing element, payment terminal, and other components. In some instances, an unauthorized user may attempt to remove one or more components from the cart to tamper with the individual components. The systems described herein may provide for detection of such removal through the use of switches or wire-break sensors to detect when components are physically removed from the device.

Figure 3:
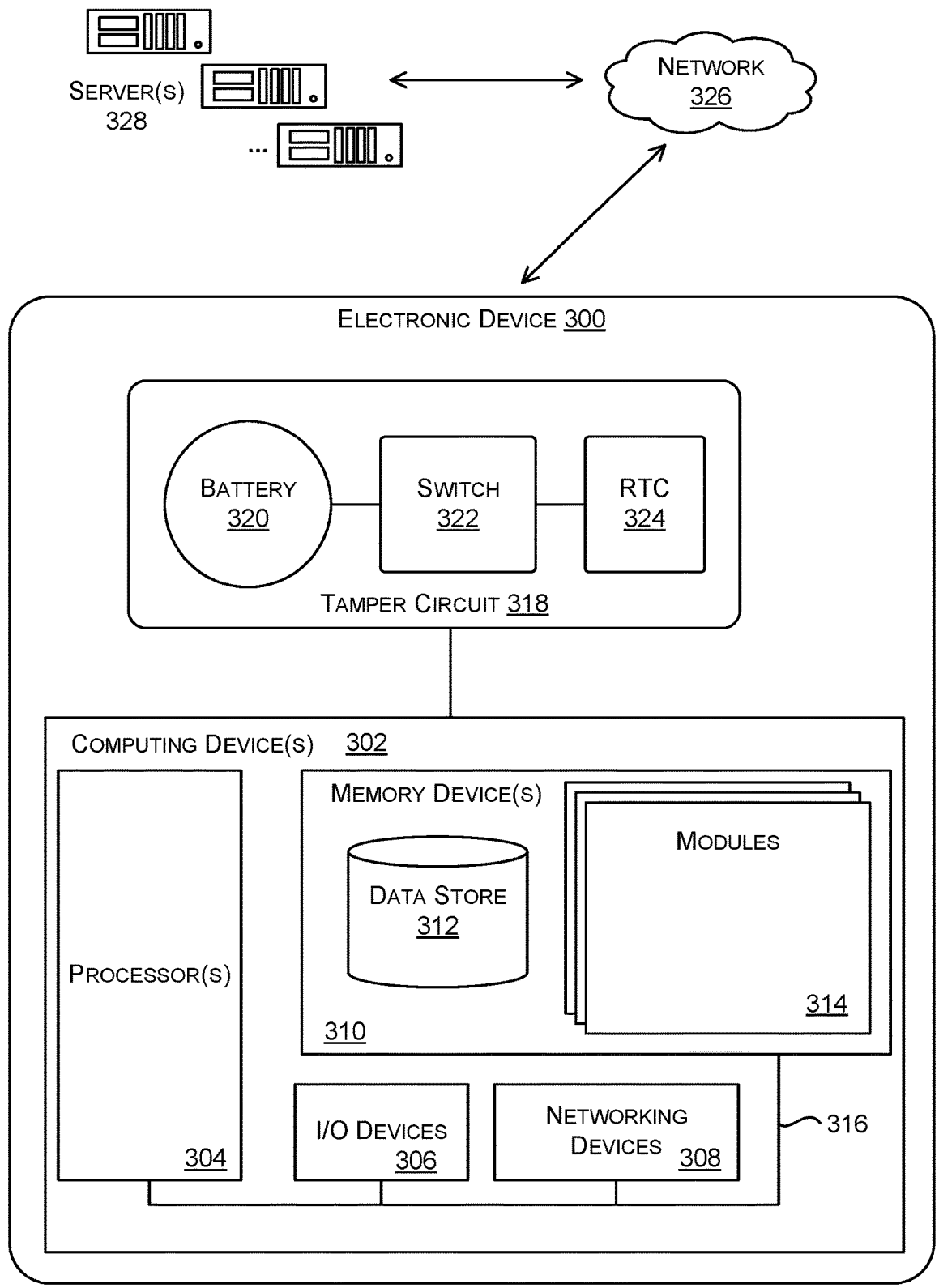
FIG. 3 illustrates an example electronic device in communication with server(s) to authenticate an RTC for tamper detection, according to at least one example.

FIG. 1 illustrates an example tamper detection system using a real-time clock (RTC) within an electronic device 100, according to at least one example. The electronic device 100 may include electronic devices such as servers, computers, networking components, user devices, payment terminals, smart shopping carts, and other such devices. In some examples, the electronic device 100 may include any suitable device capable of connecting to a remote server, including any other type of electronic devices, such as a s "smart" device or Internet of Things (IoT) device, etc. The electronic device 100 may include processor(s) 102 and computer-readable media (such as depicted in FIG. 3) for carrying out instructions from one or more services or other components. The electronic device 100 is primarily powered by a first power source, such as a primary battery (not shown) that provides power for the processor(s) 102 to perform one or more actions, as described herein.

The processor(s) 102 of the electronic device 100 may execute one or more modules and/or processes to cause the electronic device 100 to perform a variety of functions. In some embodiments, the processor(s) 102 may include a central processing unit (CPU), a graphics processing unit (GPU), both CPU and GPU, or other processing units or components known in the art. Additionally, the processor(s) 102 may possess its own local memory, which also may store program modules, program data, and/or one or more operating systems.

In at least one configuration, the electronic device 100 may include any components that may be used to receive, access, or perform actions according to services hosted thereon. Depending on the exact configuration and type of the asset, the electronic device 100 may also include volatile memory (such as RAM), non-volatile memory (such as ROM, flash memory, miniature hard drive, memory card, or the like), or some combination thereof.

The electronic device 100 is enclosed within an enclosure, including an enclosure cover 112 that may include an access panel or entire enclosure containing one or more of the components of the electronic device 100. The enclosure cover may be secured with one or more fasteners, glue, permanent or removable attachments, and may be openable for servicing the device within a service environment, such as to replace faulty components.

The electronic device 100 includes a tamper circuit 104 that includes a battery 106, a switch 108, and an RTC 110. The tamper circuit 104 is used to detect unauthorized intrusions into the enclosure cover 112 of the electronic device 100.

The RTC 110 is an example of a hardware reference clock that is powered by battery 106. Many RTCs use a 32.768 KHz external crystal oscillator and maintain a real time (also known as wall time) even when the electronic device 100 is turned off by drawing power to maintain the clock through oscillation of the crystal. The RTC 110 updates the system time of the electronic device 100 through the processor(s) 102 whenever the system clock drifts from the RTC time. The RTC 110 can be read to determine the time for updating the system time on the electronic device 100 and also to ensure no tampering has occurred on the device.

The tamper circuit 104 includes a switch 108 that may be coupled with or adjacent the enclosure cover 112 such that the switch is actuated when the enclosure cover 112 is opened. The switch 108 may include any type of switch that may be activated in response to opening of the enclosure cover 112. For example, the switch 108 may include mechanical switches, wire meshes, photosensitive switches, magnetic switches, proximity switches, or any other suitable type of switch. The switch 108 is normally open such that the switch is closed while the enclosure cover 112 is in place and becomes open or breaks the electrical connection between the battery 106 and the RTC 110 when the enclosure cover 112 is opened or removed. In some examples, a normally closed switch may be used, with the normally closed switch configured to break the electrical connection in response to removal or opening of the enclosure cover 112.

In some examples, the switch 108 may include multiple switches, for example including multiple switches arranged in series between the battery 106 and the RTC 110. The multiple switches may be configured to detect intrusions at different locations of the housing and/or to detect intrusions using different switches. For instance, in a first example multiple switches may be positioned at various access panels of an electronic device such that if a single access panel is opened then the switch 108 is opened. In a second example, the switches may include a photosensitive switch as well as a mechanical switch such that if the housing is opened then either one or both of the switches may detect opening of the housing. In this manner, in the event that the unauthorized user is able to neutralize a single switch, a secondary switch may still trigger the tamper detection.

The tamper circuit 104 uses the RTC 110 to detect if an un-authorized user has opened or tampered with the enclosure cover 112 to gain unauthorized access to code or components of the electronic device 100. The RTC 110 is connected to a coin cell battery, e.g., battery 106, or other auxiliary source that may power the RTC 110 for an extended period of time. The battery 106 is independent of a primary power source for the electronic device 100 and is connected to the RTC 110 through the switch 108 that can disconnect power to the RTC 110 when the switch 108 is actuated or released. The switch 108 may be a normally open switch that is coupled to the enclosure cover 112 and/or interacts with a portion of the enclosure cover, such as by physical contact, or proximity to a magnet placed in the enclosure cover 112 in examples using a magnetic switch. When the enclosure cover 112 is removed, the switch 108 breaks the electrical connection between the battery 106 and the RTC 110.

When the electrical connection is interrupted, the RTC 110 will lose power, which causes the RTC 110 to lose its time or fail to keep counting time. When the electronic device 100 is reassembled and reconnected to a network, such as when it is brought back into the original environment, the processor(s) 102 may query the RTC 110 for its time, as kept by the RTC 110, and may compare the time against time from a network time protocol server (NTP server) to detect if the RTC 110 is now out of sync, indicating tampering with the electronic device 100. In some examples, when the processor boots up with the electronic device, it reads the RTC time, and also checks time from the NTP server. If the time has drifted over 500 ms (or some other threshold period of time), the device may determine that the cover has been removed.

When such tampering is detected, due to the difference in time between the RTC time and the NTP time, the electronic device 100 may generate an alert, may shut down, erase sensitive data, and/or disable one or more functions of the electronic device 100. In some examples, credentials or certificates for communicating with servers or systems may be erased or disabled, thereby isolating the device from the network and preventing intrusion by the unauthorized user. In some examples, when tampering is detected, according to any of the systems or techniques described herein, the electronic device 100 may alerts a user at a user interface of the electronic device 100, may notify a security operations center, may wipe credentials stored on the electronic device 100, may wipe or reset an operating system to a factory setting, may lock power to one or more components of the electronic device 100, may lock the device and prevent accessing or using the electronic device 100, may use a GPS device and cellular or other communication component to notify a monitoring system of the location and tampering detected, may notify an asset retrieval system, or may lock one or more physical components of the electronic device 100 (e.g., to lock wheels on a smart shopping cart or other smart device).

Figure 2:
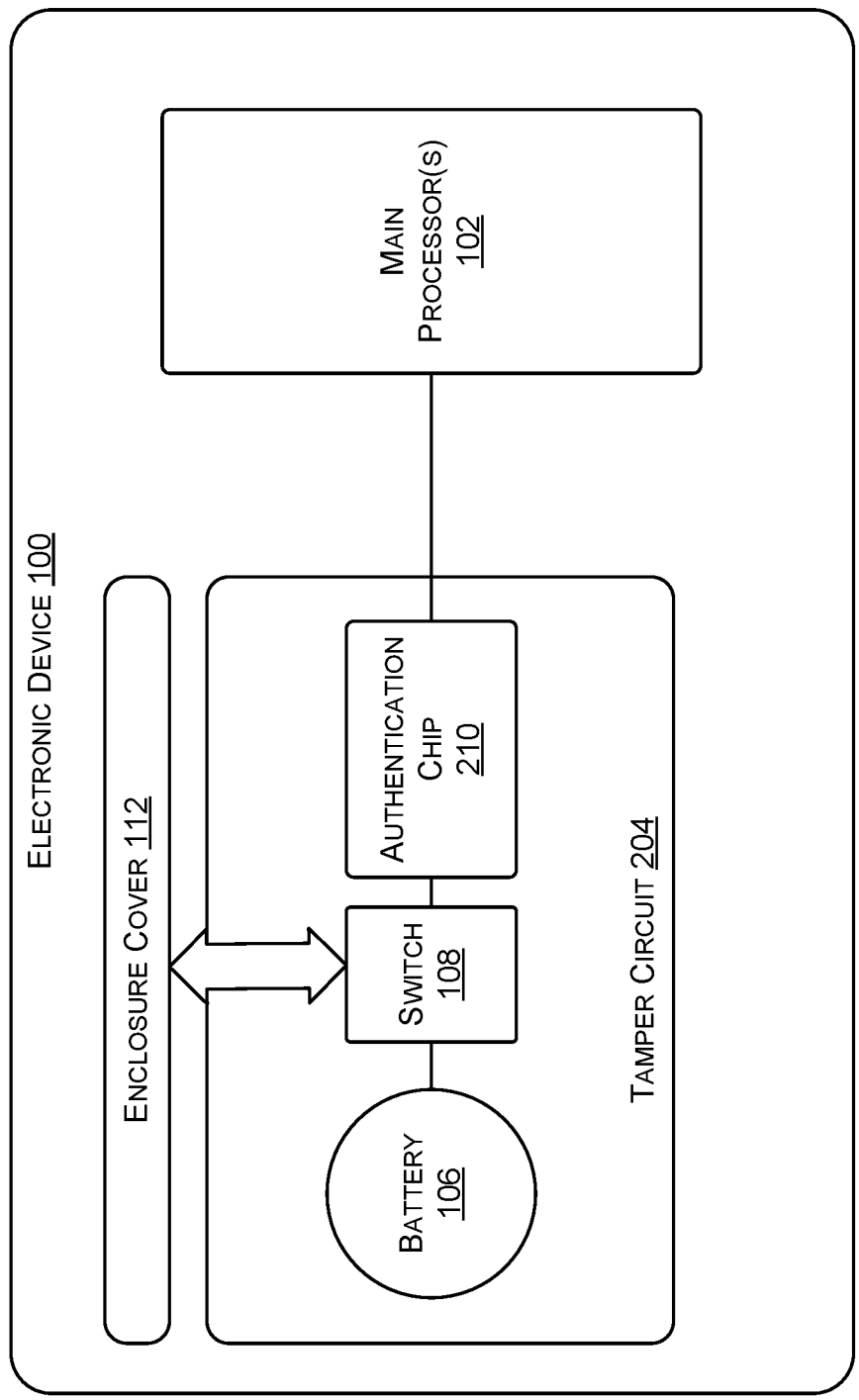
FIG. 2 illustrates an example tamper detection system using an authentication chip within an electronic device, according to at least one example.

FIG. 2 illustrates an example tamper detection system using an authentication chip 210 within an electronic device 100, according to at least one example. The electronic device 100 may be the same as the electronic device 100 of FIG. 1. The electronic device 100 may include electronic devices such as servers, computers, networking components, user devices, payment terminals, smart shopping carts, and other such devices. In some examples, the electronic device 100 may include any suitable device capable of connecting to a remote server, including any other type of electronic devices, such as a s "smart" device or Internet of Things (IoT) device, etc. The electronic device 100 may include processor(s) 102 and computer-readable media (such as depicted in FIG. 3) for carrying out instructions from one or more services or other components.

The processor(s) 102 of the electronic device 100 may execute one or more modules and/or processes to cause the electronic device 100 to perform a variety of functions. In some embodiments, the processor(s) 102 may include a central processing unit (CPU), a graphics processing unit (GPU), both CPU and GPU, or other processing units or components known in the art. Additionally, the processor(s) 102 may possess its own local memory, which also may store program modules, program data, and/or one or more operating systems.

In at least one configuration, the electronic device 100 may include any components that may be used to receive, access, or perform actions according to services hosted thereon. Depending on the exact configuration and type of the asset, the electronic device 100 may also include volatile memory (such as RAM), non-volatile memory (such as ROM, flash memory, miniature hard drive, memory card, or the like), or some combination thereof.

The electronic device 100 includes a tamper circuit 204 that uses an authentication chip 210 for tamper detection. The authentication chip 210 may include a device or circuit such as a secure cryptographic chip that may contain a secure key, a cryptographic code, an RSA number, latch setting, or other such code. The authentication chip may be arranged in a similar manner to the RTC 110, with the switch 108 between the battery 106 and the authentication chip 210. The authentication chip 210 may have or define a parameter, such as a code or latch that describes a state of the authentication chip 210. The authentication chip 210 may be configured to clear the code, parameter, or latch in the event of power interruption. For example, an authentication chip may include a cryptographic authenticator configured to clear a latch upon booting of the authentication chip 210 from a powered off state. Accordingly, when the electronic device 100 is placed into service, the latch may be set to a particular code or setting. When the enclosure cover 112 is opened and the switch 108 disconnects the battery 106 and the authentication chip 210, the authentication chip 210 will clear the latch upon having power restored. As such, upon having power restored and returning to the network environment, the electronic device 100 will no longer have a stored code, key, or correct cryptographic authenticator to match a server-based authenticator. Accordingly, the electronic device 100 may detect tampering. In some examples, the authentication chip 210 may be accessed by the main processor(s) 102 to detect tampering without requiring verification against a server, but rather tamper detection may be performed on-board the electronic device based on the state of the latch set at the authentication chip.

When the processor(s) 102 boots up for the first time, it sets the latch of the authentication chip 210. When the processor(s) 102 is/are turned off or the main power for the electronic device 100 is removed, the authentication chip 210 may switch to power from the battery 106 to keep the latch set. In some examples, the authentication chip 210 may be solely powered by the battery 106, while in some other examples it may be powered by the main battery of the electronic device 100 unless and until the electronic device is powered down, whereon the battery 106 may power the authentication chip 210 to maintain the latch. Once the power to the processor(s) 102 is restored, the processor(s) 102 can read the latch state of the authentication chip 210. If the latch was cleared, an intrusion was detected.

FIG. 3 illustrates an electronic device 300 in communication with server(s) 328 to authenticate an RTC for tamper detection, according to at least one example. Though depicted with the RTC 324 in a tamper circuit 318 as shown and described in FIG. 1, the tamper circuit 204 of FIG. 2 may also be implemented in the electronic device 300.

In various embodiments, the server(s) 328 may be part of a network, a cloud-based service, a service provider, a service, or any number of servers or entities that may provide products and services, such as described herein. For instance, the server(s) 328 may include an NTP server for providing a network time to compare against time as stored by the RTC 324.

In some embodiments, the network(s) 326 may be any type of network known in the art, such as the Internet. Moreover, the electronic device 300 and the server(s) 328 may communicatively couple to the network(s) 326 in any manner, such as by a wired or wireless connection. The network(s) 326 may also facilitate communication between the electronic device 300 and the server(s) 328.

FIG. 3 includes a diagrammatic representation of a machine in the exemplary form of a computer device 302 within which a set of instructions, for causing the machine to perform any one or more of the methodologies discussed herein, may be executed. The computer device 302 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer device 302 includes a processor(s) 304, a memory device 310 (e.g., read-only memory (ROM), flash memory, dynamic random-access memory (DRAM) such as synchronous DRAM (SDRAM)), input/output devices 306, and network interface device 308, which communicate with each other via a bus 316.

Processor(s) 304 represents one or more general-purpose processing devices such as a microprocessor, central processing unit, or the like. More particularly, the processor(s) 304 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor(s) 304 may also be one or more special-purpose processing devices such as an application specific integrated circuit (ASIC), a field programmable gate array (FPGA), a digital signal processor (DSP), network processor, or the like.

The computer device 302 may further include a network interface device 308. The computer device 302 also may include input/output devices 306 such as a video display unit (e.g., a liquid crystal display (LCD) or a cathode ray tube (CRT)), an alphanumeric input device (e.g., a keyboard), a cursor control device (e.g., a mouse), and a signal generation device (e.g., a speaker).

The data storage device 312 may include a computer-readable storage medium on which is stored one or more sets of instructions for the platform or engines described herein, embodying any one or more of the methodologies or functions described herein. The instructions may also reside, completely or at least partially, within the memory device 310 and/or within processing logic of the processor(s) 304 during execution thereof by the computer device 302, the memory device 310 and the processor(s) 304 also constituting computer-readable media.

While the memory device 310 is shown in an exemplary embodiment to be a single medium, the term "computer-readable storage medium" or "memory device" should be taken to include a single medium or multiple media (e.g., a centralized or distributed database, and/or associated caches and servers) that store the one or more sets of instructions. The term "computer-readable storage medium" shall also be taken to include any non-transitory computer-readable medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The memory device 310 includes one or more modules 314 for performing various functions of the computer device 302, such as providing information, processing data, communicating with other systems, etc.

The electronic device 300 includes a tamper circuit 318 that includes a battery 320, a switch 322, and an RTC 324. The tamper circuit 318 is used to detect unauthorized intrusions into the electronic device 300.

The RTC 324 is an example of a hardware reference clock that is powered by battery 320 and/or a main battery of the electronic device 300. The RTC 324 updates the system time of the electronic device 300 through the processor(s) 304 whenever the system clock drifts from the RTC time. The RTC 324 can be read to determine the time for updating the system time on the electronic device 300 and also to ensure no tampering has occurred on the device.

The tamper circuit 318 includes a switch 322 that may be coupled with a portion of a housing for the electronic device 300 such that the switch is actuated when the housing is opened. The switch 322 may include any type of switch that may be activated in response to opening of the housing. For example, the switch 322 may include mechanical switches, wire meshes, photosensitive switches, magnetic switches, proximity switches, or any other suitable type of switch. The switch 322 is normally open such that the switch is closed while the housing is closed and becomes open or breaks the electrical connection between the battery 320 and the RTC 324 when the housing is opened or removed.

The tamper circuit 318 uses the RTC 324 to detect if an un-authorized user has opened or tampered with the housing and/or the electronic device 300 to gain unauthorized access to code or components of the electronic device 300. The RTC 324 is connected to a coin cell battery, e.g., battery 320, or other auxiliary source that may power the RTC 324 for an extended period of time. The battery 320 may be independent of a primary power source for the electronic device 300 and is connected to the RTC 324 through the switch 322 that can disconnect power to the RTC 324 when the switch 322 is actuated or released. The switch 322 may be a normally open switch that is coupled to the housing and/or interacts with a portion of the housing, such as by physical contact, or proximity to a magnet coupled to the housing in examples using a magnetic switch. When the housing is opened, the switch 322 breaks the electrical connection between the battery 320 and the RTC 324 and causes the RTC 324 to lose time.

When the electrical connection is interrupted, the RTC 324 will lose power, which causes the RTC 324 to lose its time or fail to keep counting time. When the electronic device 300 is reassembled and reconnected to a network, such as when it is brought back into the original environment, the processor(s) 304 may query the RTC 324 for its time, as kept by the RTC 324, and may compare the time against time from an NTP server to detect if the RTC 324 is now out of sync, indicating tampering with the electronic device 300. In some examples, when the processor(s) 304 boots up with the electronic device 300, it reads the RTC time, and also checks time from the NTP server. If the time has drifted over 500 ms (or some other threshold period of time), the electronic device 300 may determine that the cover has been removed.

In some examples, the tamper circuit 318 may be temporarily disabled, such as when the electronic device 300 is in a service mode or state. For example, a service center may execute code on the processor(s) 304 that causes the electronic device 300 to temporarily suspend querying of the RTC 324 for tamper detection such that the electronic device 300 may be serviced. When the service is complete, the RTC 324 may be se-synced to the NTP server before causing the electronic device 300 to return to querying the tamper circuit 318 for tamper detection.

When tampering is detected, due to the difference in time between the RTC time and the NTP time, the electronic device 300 may generate an alert, may shut down, erase sensitive data, and/or disable one or more functions of the electronic device 300. In some examples, credentials or certificates for communicating with servers or systems may be erased or disabled, thereby isolating the device from the network and preventing intrusion by the unauthorized user.

Figure 4:
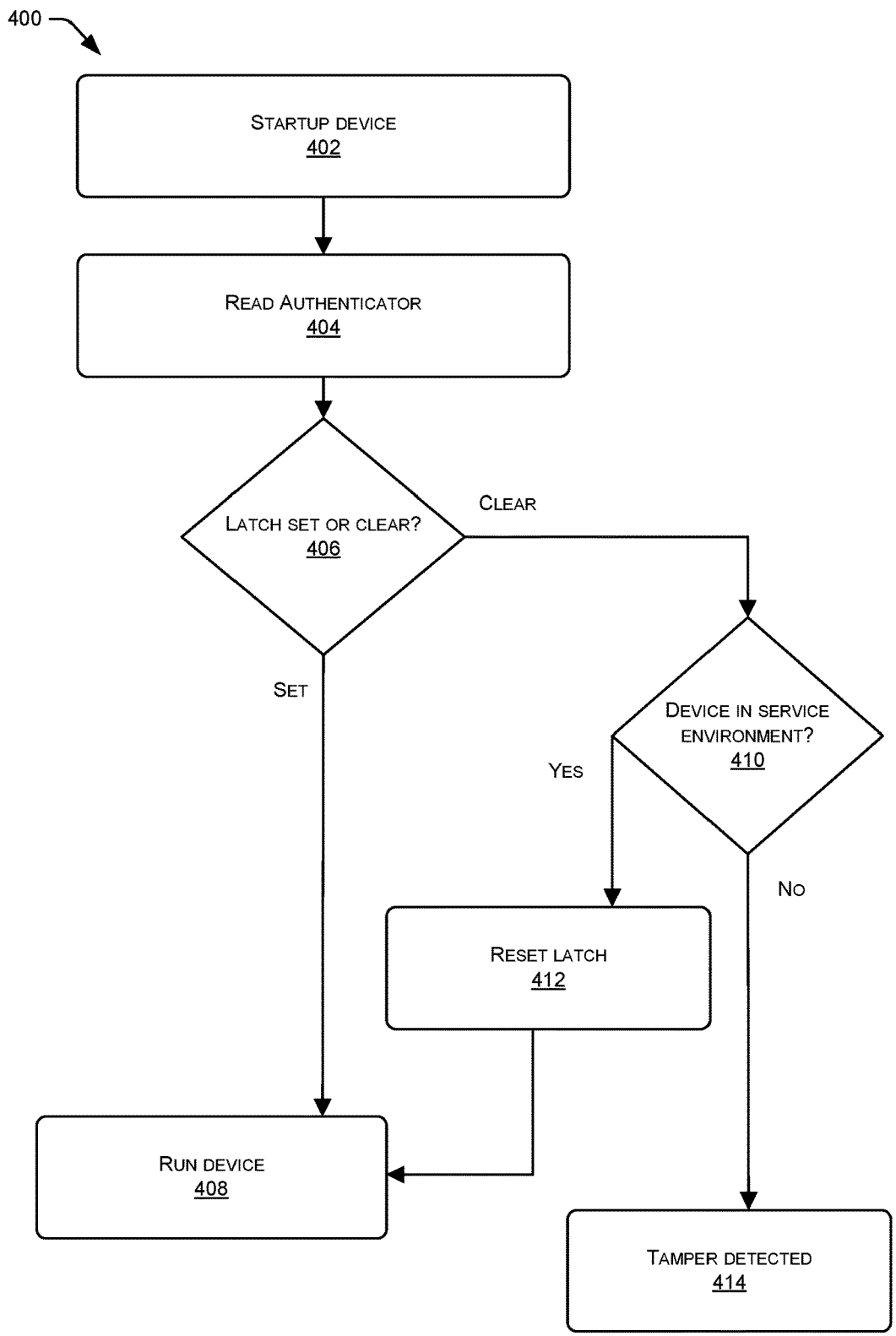
FIG. 4 illustrates an example process for tamper detection using a cryptographic authentication chip, according to at least one example.
Figure 5:
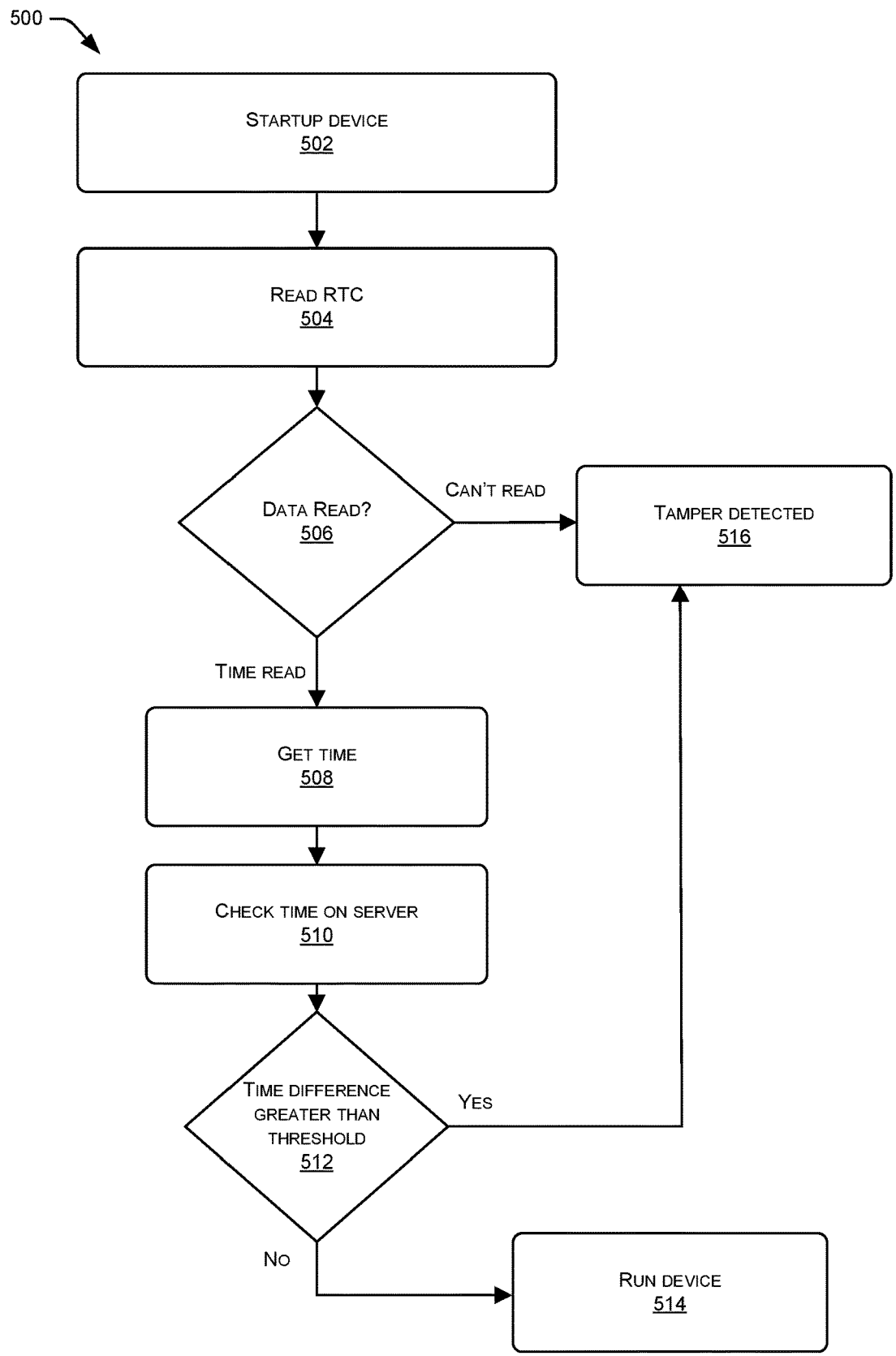
FIG. 5 illustrates an example process for tamper detection using an RTC within a tamper detection circuit, according to at least one example.

FIGS. 4-5 illustrate flow diagrams of methods according to the present technology. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

FIG. 4 illustrates a process 400 for tamper detection using a cryptographic authentication chip, according to at least one example. The tamper detection may be performed using some or all of the systems described with respect to FIGS. 1-3 and may include a tamper circuit including a secondary power source, an authentication chip, and a switch electrically coupled between the secondary power source and the authentication chip configured to electrically disconnect the authentication chip from the power source in response to the housing of the electronic device being opened.

The electronic device may be equipped with a cryptographic authenticator (e.g., the authentication chip), such as a device containing a secure key, a cryptographic code, an RSA number, or other such code. The authenticator may have a parameter, such as a code or latch that describes a state of the authenticator. The authenticator may be configured to clear the code, parameter, or latch in the event of power interruption. As such, upon having power restored and returning to the network environment, the electronic device will no longer have a stored code, key, or correct cryptographic authenticator to match a server-based authenticator. Accordingly, the electronic device may detect tampering.

At 402, the process 400 includes starting up an electronic device. The startup or booting may be performed by a processor of the electronic device and may be in response to a signal or input to the electronic device. In some examples, the process 400 may be performed iteratively or repeatedly at set intervals or varying period of time during operation of the electronic device, thereby continuously checking for evidence of tampering, even outside of a bootup phase for the electronic device.

At 404, the process 400 includes reading the authentication chip, which may include reading data stored thereon such as a key or latch setting or other such parameter. The data may be read by a processor of the electronic device. In some examples, tamper may be detected in the event that the processor is unable to read the authentication chip data, indicating it is removed or disconnected and the process may proceed directly to 414.

At 406, the process 400 includes determining if the latch is set or clear within the authentication chip. In some examples, the latch setting may be evaluated because the latch may be configured to clear when the authentication chip boots up, therefore, if the latch is clear then the authentication chip has been shut off, due to tampering, and the latch is clear when the authentication chip is subsequently booted up. In the event that the latch is set, the process 400 proceeds to 408 where the electronic device operates in a first mode. The first mode may include the electronic device operating in a normal operating state with full functionality.

In some examples, the authentication chip may include one or more keys or cryptographic codes that may be evaluated against a server-based code to determine if the authentication chip has been deactivated for some period of time by opening the housing of the electronic device. In such examples, at 406, the process 400 may further compare the code or setting against a server-based value.

At 410, the process 400 includes determining if the device is in a service environment, in response to the latch being clear or the code at the authentication chip failing to match the server-based value. The device may determine if it is in a service environment based on a location of the device, particular mode the device is placed into, credentials entered, or other such data that may be used in a service environment to interact with the electronic device in a service-based manner outside of normal operation. In some examples, a counter associated with the authentication chip may maintain a count of a number of times the housing is opened and/or the internals of the electronic device are accessed. In a service setting, the service center may set the counter or increment the counter on a server-based system such that the counter of the authentication chip and the server-based counter remain equal. In the event that the counter becomes unequal from the server-based counter, then tampering is detected.

In the event that the device is determined to be in a service environment, the process 400 includes, at 412, resetting the latch or clearing any alarms, resetting the tamper detection system (such as by resetting a code, key, or latch) and running the device at 408.

In the event that the electronic device is determined to not be in a service environment, the process 400 includes detecting tampering at 414. When tampering is detected, due to the data read from the authentication chip, the electronic device may generate an alert, may shut down, erase sensitive data, and/or disable one or more functions of the electronic device. In some examples, credentials or certificates for communicating with servers or systems may be erased or disabled, thereby isolating the device from the network and preventing intrusion by the unauthorized user. In some examples, the electronic device may operate in a second mode where one or more of the above actions may be performed in response to detecting tampering.

FIG. 5 illustrates a process 500 for tamper detection using an RTC within a tamper detection circuit, according to at least one example. The tamper detection may be performed using some or all of the systems described with respect to FIGS. 1-3 and may include a tamper circuit including a secondary power source, an RTC, and a switch electrically coupled between the secondary power source and the RTC configured to electrically disconnect the RTC from the power source in response to the housing of the electronic device being opened.

At 502, the process 500 includes starting up an electronic device. The startup or booting may be performed by a processor of the electronic device and may be in response to a signal or input to the electronic device. In some examples, the process 500 may be performed iteratively or repeatedly at set intervals or varying period of time during operation of the electronic device, thereby continuously checking for evidence of tampering, even outside of a bootup phase for the electronic device.

At 504, the process 500 includes reading first time data or first data from the RTC. The first time data may be read by a processor of the electronic device.

At 506, the process 500 includes determining if the RTC data can be read from the RTC. In the event that the RTC data cannot be read, the electronic device may detect tampering at 516.

In the event that the electronic device detects tampering at 516, the electronic device may generate an alert, may shut down, erase sensitive data, and/or disable one or more functions of the electronic device. In some examples, credentials or certificates for communicating with servers or systems may be erased or disabled, thereby isolating the device from the network and preventing intrusion by the unauthorized user. In some examples, the electronic device may operate in a second mode where one or more of the above actions may be performed in response to detecting tampering.

At 508, the process 500 includes getting or reading first data from the RTC including first time data. At 510, the process 500 also includes the electronic device accessing second data including time from an NTP server.

At 512, the process 500 includes determining if a time difference between the first data and the second data is equal to or greater than a threshold amount. In some examples the threshold amount may be set at 500 ms or less, or may be any other suitable threshold, given an accuracy of the particular RTC component. In some examples, the threshold may be variable based on one or more factors such as the expected time for the electronic device to remain in storage, expected operating temperature range of the device, accuracy or drift of the RTC, or other such factors. In some examples, the threshold may be variable and/or may be greater than or less than 500 ms based on evaluation of factors. The threshold may be set prior to shipping the electronic device or may be determined on-board the device based on currently detected environmental parameters that may affect performance of the RTC, such as temperature and humidity. In response to the difference being equal to or greater than the threshold, the process 500 may proceed to 516 where tampering is detected. The tamper detection may cause the electronic device to operate in a particular mode, such as a first mode where one or more systems are disabled, etc. In response to the difference being less than the threshold, the process 500 may proceed to 514 where the electronic device may operate in a typical fashion.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "processing", "combining", "verifying", "determining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. In addition, embodiments of the present disclosure are described with reference to Java 8, JML and Open JML. However, it should be understood that the principles and techniques set forth herein may be applied to other programming languages that have both imperative programming features and functional programming features. Accordingly, it will be appreciated that a variety of programming languages may be used to implement the teachings of the embodiments of the disclosure as described herein.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features, it is to be understood that the subject matter defined in the appended claims is not necessarily limited to the specific features described. Rather, the specific features are disclosed as illustrative forms of implementing the claims.

The invention claimed is:

1. A system comprising:
an electronic device comprising:
at least one processor;
a first power source configured to provide power to the at least one processor;
a tamper detection circuit comprising:
a second power source;
an authentication component configured to clear first data of the authentication component in response to the authentication component losing connection with the second power source; and
a switch configured to interrupt a connection between the second power source and the authentication component in response to an enclosure of the electronic device being opened; and
one or more non-transitory media having instructions stored thereon that, when executed by the at least one processor, cause the at least one processor to at least:
determine first data from the authentication component;
access second data stored in association with the electronic device;
determine to operate the electronic device in a first mode with one or more limitations on operation of the electronic device in response to the first data being cleared;
determine a difference between the first data and the second data in response to the first data not being cleared;
in response to the difference being greater than or equal to a threshold, cause the electronic device to operate in the first mode; and
in response to the difference being less than the threshold, cause the electronic device to operate in a second mode.

2. The system of claim 1, wherein the instructions comprise further instructions that, when executed by the at least one processor, cause the at least one processor to further cause the electronic device to operate in the first mode in response to being unable to determine the first data from the authentication component.

3. The system of claim 1, wherein causing the electronic device to operate in the first mode comprises:
generating an alert indicative of tampering on the electronic device; and
disabling one or more functions of the electronic device.

4. The system of claim 1, wherein the switch includes at least one of:
a magnetic switch;

a photosensitive switch;
a mechanical switch;
a reed switch; or
a wire mesh.

5. A method comprising:
determining, by an electronic device accessing an authentication component within a housing of the electronic device, first data, wherein the authentication component is coupled to a first power source via a switch configured to disconnect the first power source and the authentication component when the housing is opened, wherein the authentication component is configured to clear the first data in response to being disconnected from the first power source;
determining, by a processor of the electronic device, second data stored in a non-volatile memory of the electronic device, the second data describing authentication data associated with the first data;
in response to the first data corresponding to the second data, causing the electronic device to operate in a first mode; and
in response to the first data differing from the second data causing the electronic device to operate in a second mode, wherein one or more operations of the electronic device are disabled when the electronic device is operating in the second mode.

6. The method of claim 5, wherein the authentication component comprises a real-time component, the first data comprises first time data, and the second data comprises second time data accessed from a server communicably coupled with the electronic device.

7. The method of claim 5, wherein the first power source is separate from a second power source configured to power the electronic device.

8. The method of claim 5, wherein the authentication component comprises a cryptographic authenticator that verifies a cryptographic key against a server key when the electronic device is connected to a network.

9. The method of claim 5, wherein the authentication component comprises a parameter that clears when the authentication component is disconnected from the first power source, the parameter only configurable by an authorized command, and the second data stored on a memory of the electronic device.

10. The method of claim 5, wherein the switch comprises a first switch and a second switch arranged in series between the authentication component and the first power source.

11. The method of claim 5, wherein causing the electronic device to operate in the second mode comprises disabling one or more certificates for communicating with an external server.

12. The method of claim 5, wherein causing the electronic device to operate in the second mode comprises disabling one or more functions of the electronic device.

13. An electronic device comprising:
an enclosure housing components of the electronic device;
a tamper detection circuit comprising:
an auxiliary power source;
an authentication component comprising a memory and electrically coupled to the auxiliary power source and configured to clear first data from the memory in response to the auxiliary power source being disconnected from the authentication component; and
a switch configured to interrupt a connection between the auxiliary power source and the authentication component, the switch configured to interrupt the connection in response to an enclosure of the electronic device being opened;
one or more processors connected to a primary power source; and
one or more non-transitory media having instructions stored thereon that, when executed by the one or more processors, cause the one or more processors to perform actions comprising:
determining first data from the memory of the authentication component;
determining, in response to the first data being cleared, whether the electronic device is in a service mode;
determining, in response to the electronic device is in the service mode, to reset the authentication component;
determining, in response to the electronic device not being in the service mode, to operate the electronic device in a second mode;
determining, in response to the first data being stored in the memory, second data from a non-volatile memory of the electronic device describing data associated with the first data;
determining, in response to the first data being stored in the memory, a comparison between the first data and the second data;
in response to the first data being within a first threshold of the second data, causing the electronic device to operate in a first mode; and
in response to the first data being outside of the first threshold of the second data, causing the electronic device to operate in the second mode.

14. The electronic device of claim 13, wherein the authentication component comprises a parameter that clears when the authentication component is disconnected from the auxiliary power source, the parameter only configurable by an authorized command.

15. The electronic device of claim 13, wherein causing the electronic device to operate in the second mode comprises disabling one or more functions of the electronic device.

16. The electronic device of claim 13, wherein the switch comprises a first switch and a second switch arranged in series between the authentication component and the auxiliary power source.

17. The electronic device of claim 13, wherein the authentication component comprises a cryptographic authenticator that verifies a cryptographic key against a server key when the electronic device is connected to a network.

18. The electronic device of claim 13, wherein the authentication component comprises a real-time component, the first data comprises first time data, and the second data comprises second time data.

19. The electronic device of claim 13, wherein the instructions comprise further instructions that, when executed by the one or more processors, cause the one or more processors to further cause the electronic device to operate in the second mode in response to being unable to determine the first data from the authentication component.

20. The electronic device of claim 13, wherein causing the electronic device to operate in the second mode comprises:
generating an alert indicative of tampering on the electronic device; and
disabling one or more functions of the electronic device.

* * * * *